(12) United States Patent
Ianello et al.

(10) Patent No.: US 6,170,248 B1
(45) Date of Patent: Jan. 9, 2001

(54) DOG BONE CHAIN LINK

(75) Inventors: Garrick J. Ianello, Vancouver, WA (US); Bruce C. Johnson, Gresham, OR (US)

(73) Assignee: Columbia Steel Casting Co., Inc., Portland, OR (US)

( * ) Notice: Under 35 U.S.C. 154(b), the term of this patent shall be extended for 0 days.

(21) Appl. No.: 09/305,840

(22) Filed: May 5, 1999

Related U.S. Application Data

(63) Continuation-in-part of application No. 09/229,472, filed on Jan. 13, 1999, now abandoned.

(51) Int. Cl.[7] .................................................. F16G 13/12
(52) U.S. Cl. ......................................................... 59/78; 59/84
(58) Field of Search .................................... 59/78, 83, 84, 59/93

(56) References Cited

U.S. PATENT DOCUMENTS

| | | |
|---|---|---|
| 1,810,978 | 6/1931 | Moore . |
| 2,192,946 | 3/1940 | Towner ...................................... 59/84 |
| 2,242,783 | 5/1941 | Grau ........................................... 59/84 |
| 3,028,725 | 4/1962 | Stevens ...................................... 59/84 |
| 3,461,666 | 8/1969 | Burstall ...................................... 59/84 |
| 3,545,200 | 12/1970 | Fagan ......................................... 59/93 |
| 3,996,737 | 12/1976 | Burstall . |
| 4,068,467 | 1/1978 | Schreyer et al. .......................... 59/93 |
| 4,497,169 | 2/1985 | Millington ............................... 59/78 |

*Primary Examiner*—David Jones
(74) *Attorney, Agent, or Firm*—Klarquist Sparkman Campbell Leigh & Whinston, LLP

(57) ABSTRACT

A chain link comprising a shank portion connected to a pair of eye portions at each end of the shank so as to form a dog-bone shape with eyelets at the ends. The eyelets are formed by a Y-shaped root section that is connected to a half-torus-shaped hat section. The cross-section profile of the shank portion is round, square, or, alternatively, an I-beam shape. The eye portions include an inner portion having an arcuate inner surface and an outer portion being substantially rectangular in cross-section. The chain link is preferably made of a high-strength alloy steel and is especially well-suited for use in dragline hoist chains.

15 Claims, 8 Drawing Sheets

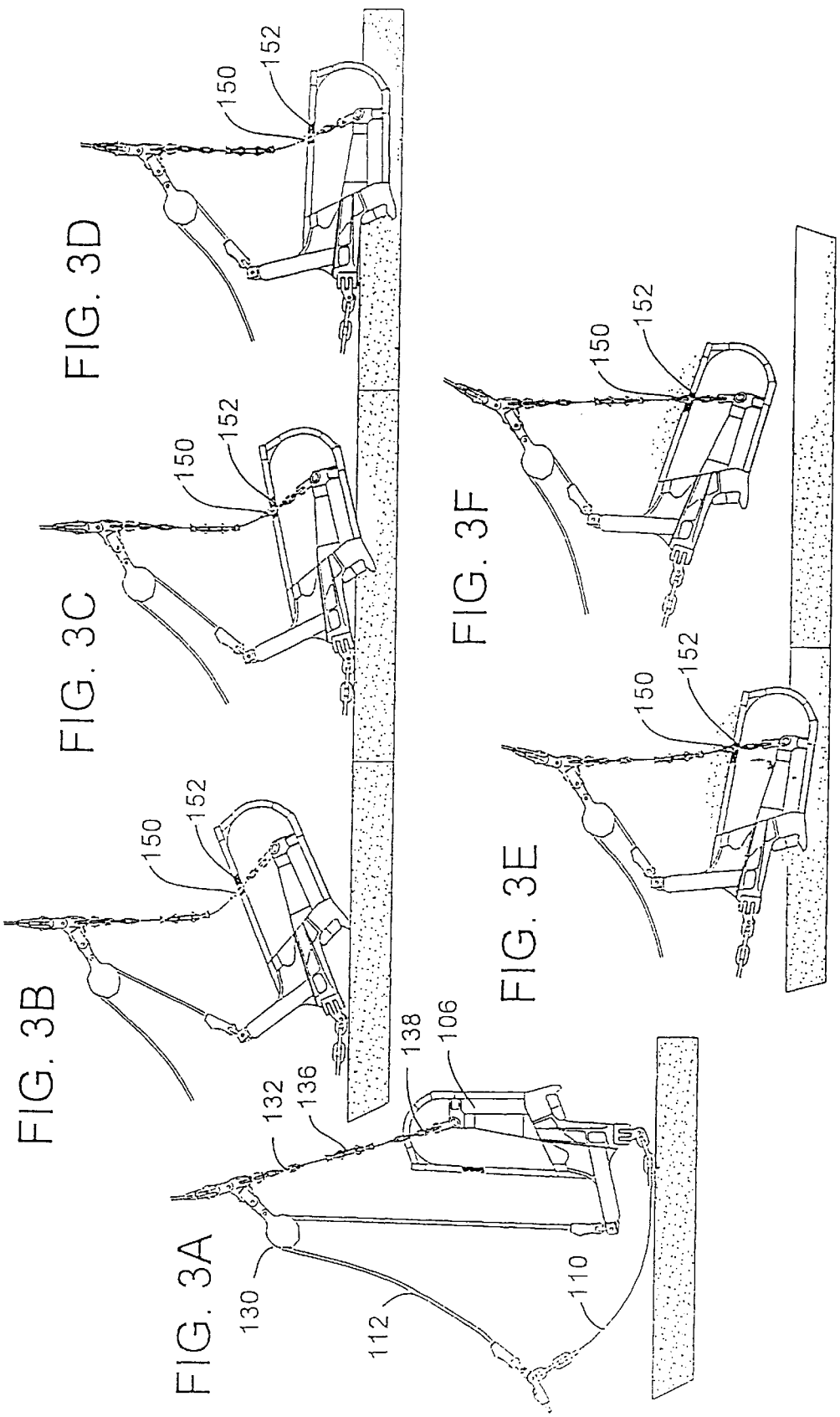

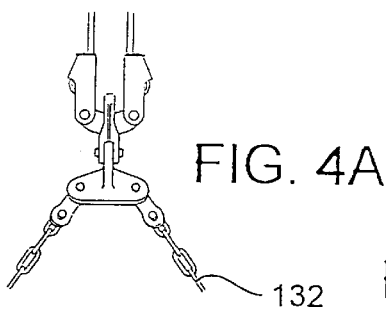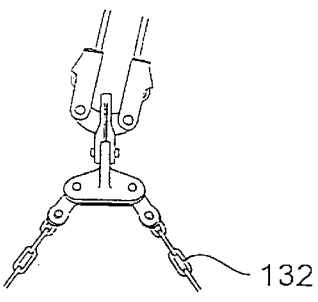
FIG. 4A  FIG. 4B
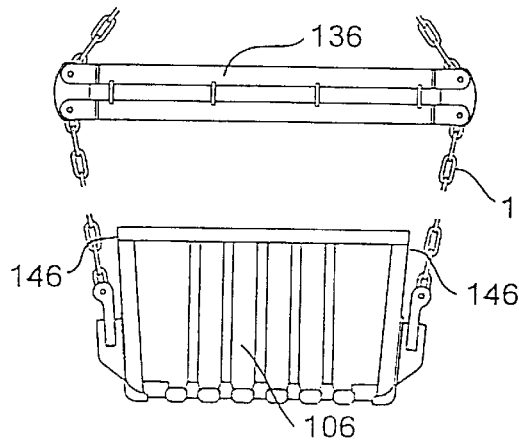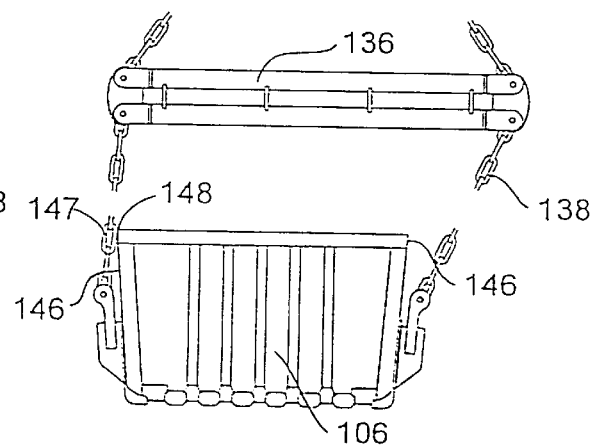
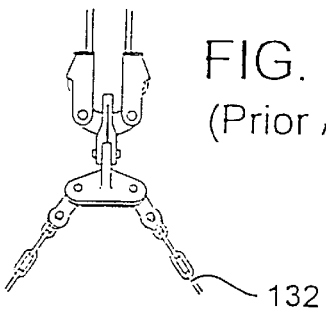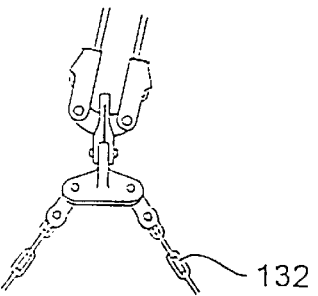
FIG. 5A
(Prior Art)
FIG. 5B
(Prior Art)
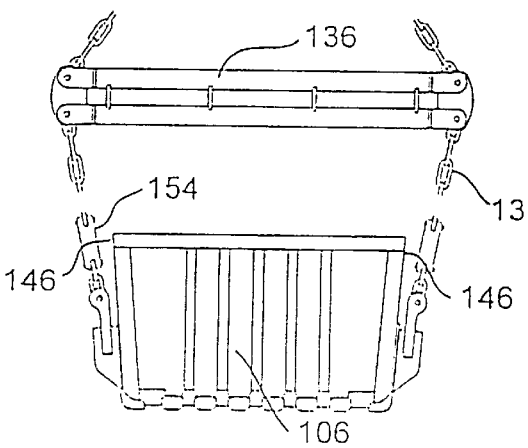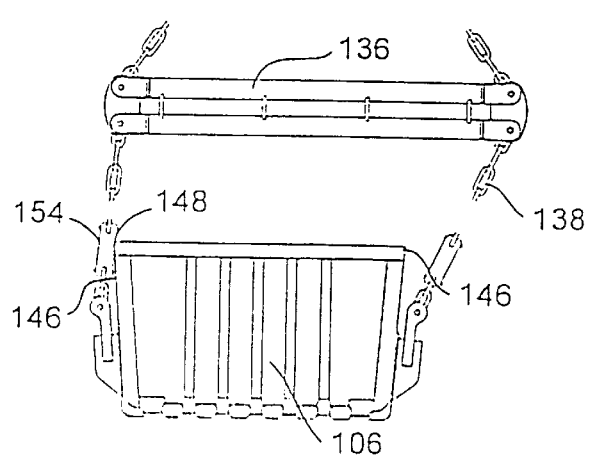

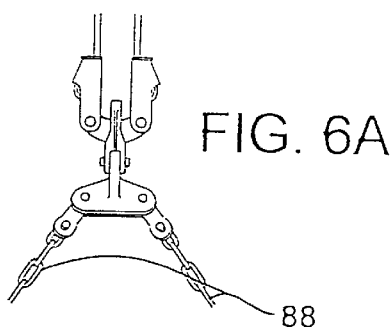
FIG. 6A
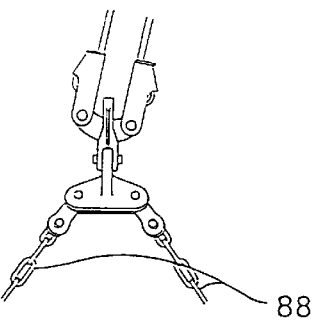
FIG. 6B
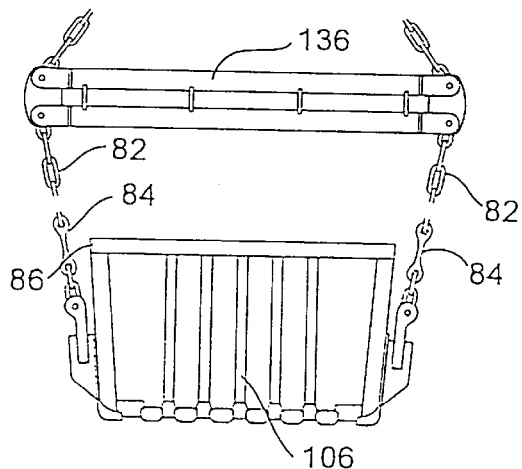
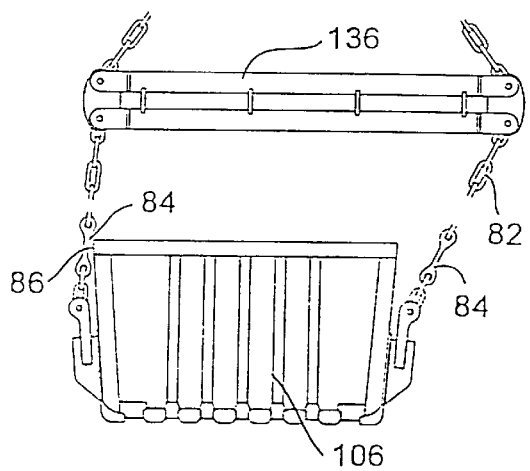
FIG. 6C
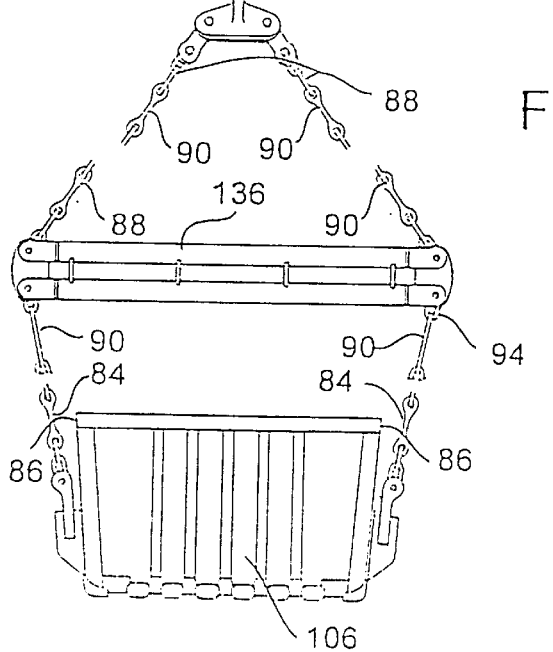
FIG. 6D
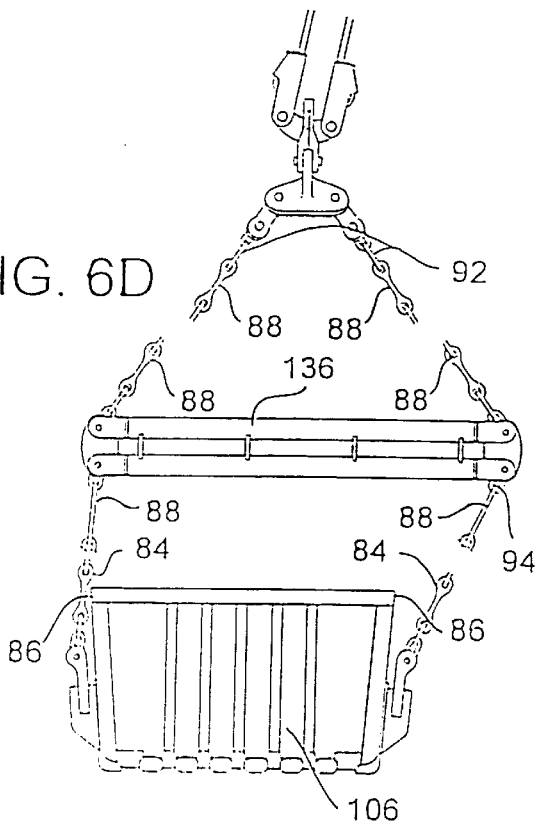

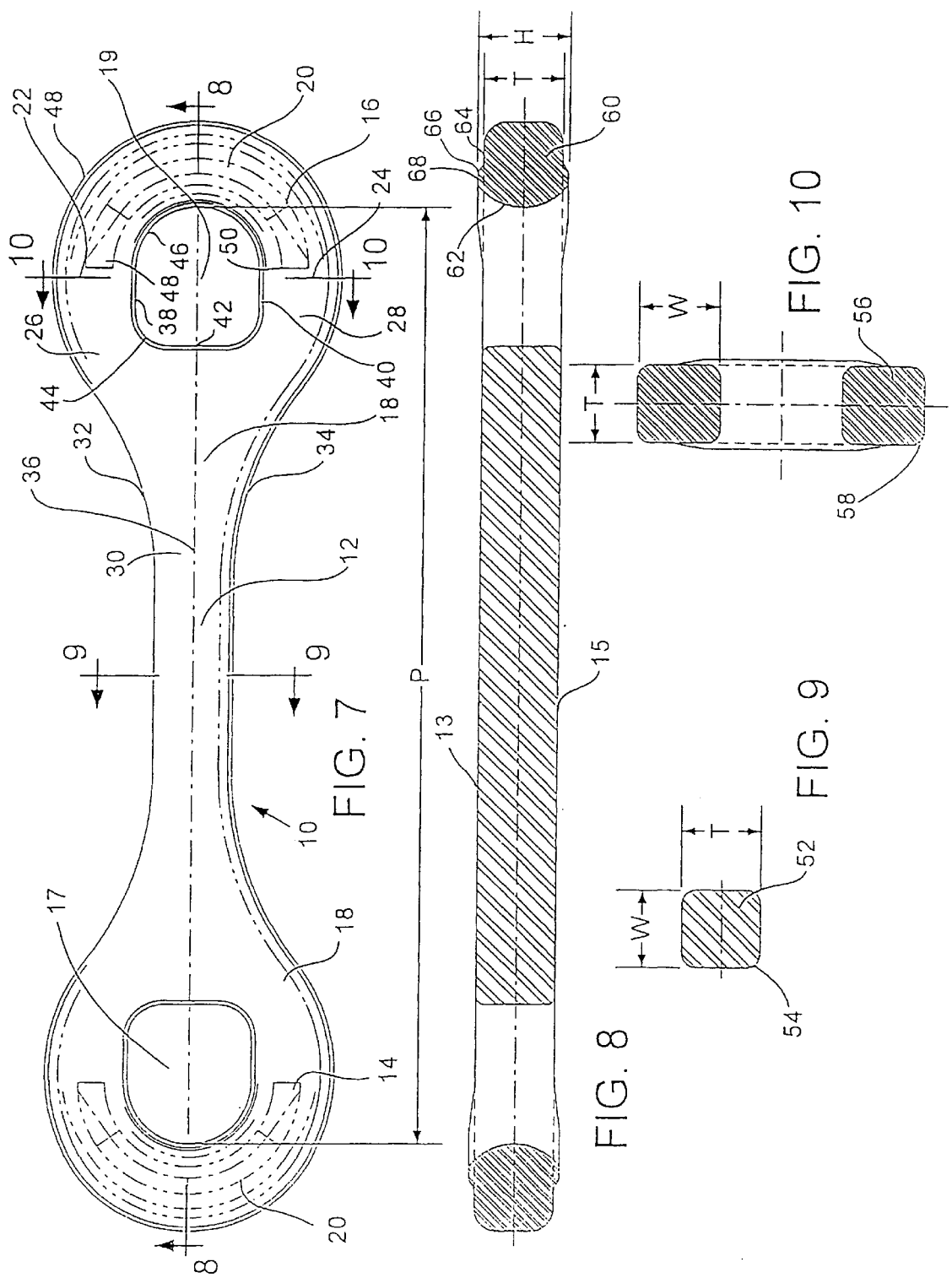

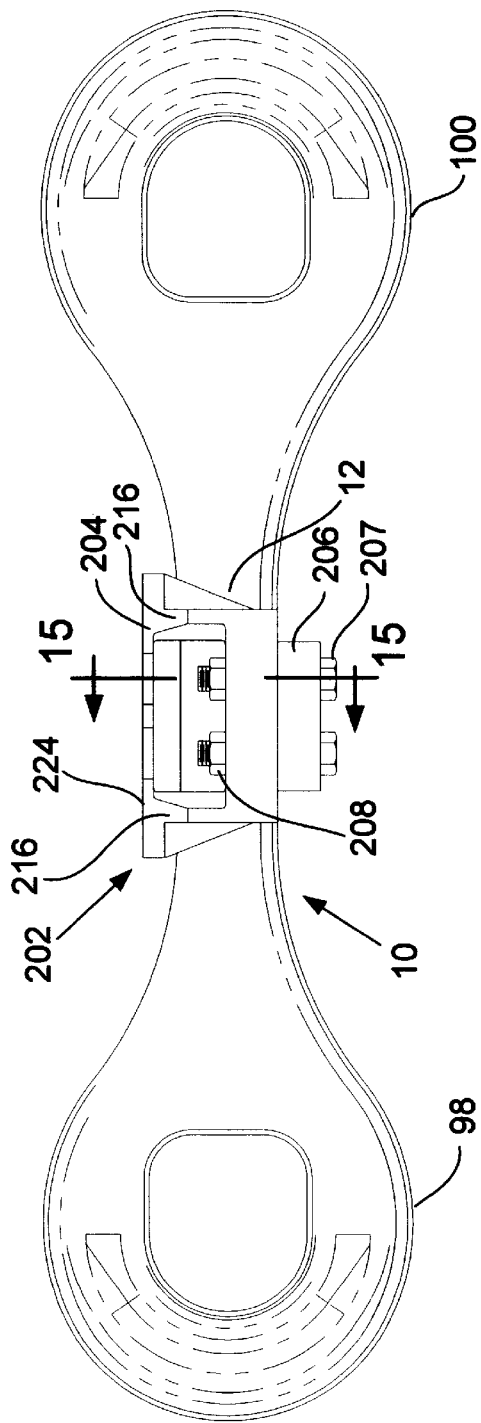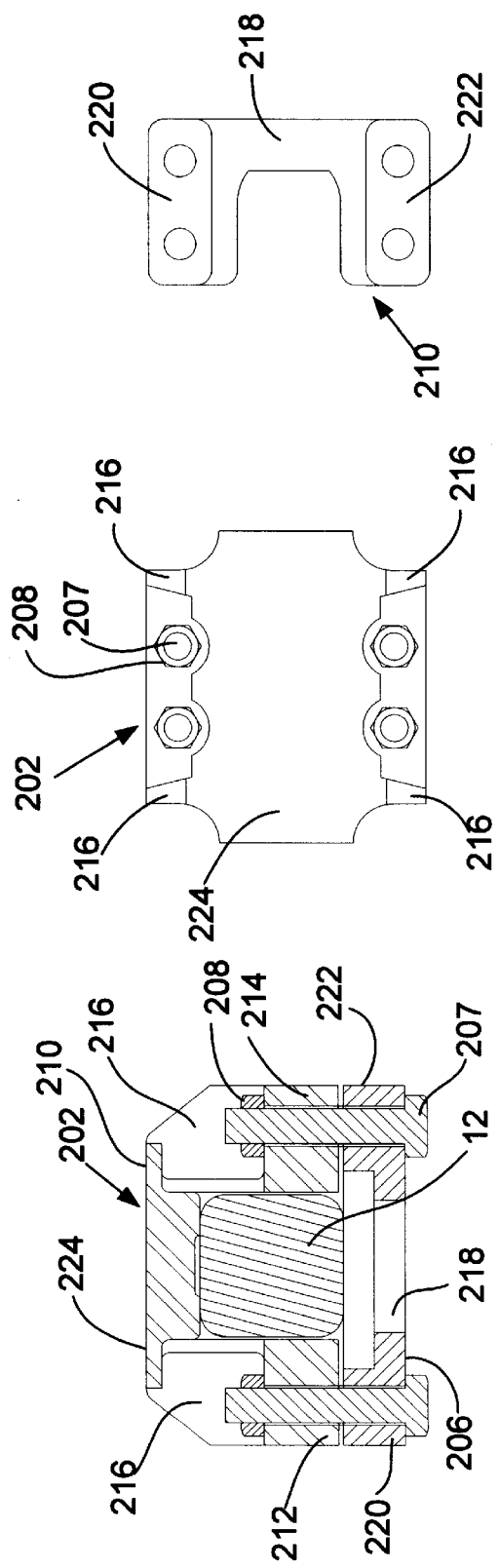

DOG BONE CHAIN LINK

This application is a continuation-in-part of application Ser. No. 09/229,472, filed Jan. 13, 1999, now abandoned.

FIELD OF THE INVENTION

The present invention pertains to chains and chain links in general, and dragline chains in particular.

BACKGROUND OF THE INVENTION

Draglines are commonly used for removing large volumes of material, such as dirt, loosened ore, etc., and are particularly well-suited for removing overburden in large strip mining operations where tens of millions of yards of material must be removed in an efficient manner. A typical dragline is shown in FIG. 1. Draglines work by dragging a large bucket along the surface to scoop up material, hence the name. Draglines provide several advantageous features over other earthmoving equipment, including a long reach for both digging and dumping, the ability to dig below their tracks (or base), and a high cycle speed.

Draglines are available in a variety of different sizes, with the largest draglines being among the most massive mobile equipment ever produced. For example, the dragline shown in FIG. 1 is a Marion 8750 series dragline that has a 360 foot boom, and is equipped with a 135 cubic yard bucket. The largest dragline ever built has a bucket capacity of 220 cubic yards and weighs nearly 14,000 tons.

Referring to FIG. 1, the major components of a dragline include a powerplant 100, a boom 102, a hoist cable 104, a bucket 106, hoist chains 108, drag chains 110, dump cables 112, and drag cables 114. The machine powerplant 100 is mounted on a rotary base 115, allowing the boom to swing in the horizontal plane. Smaller draglines typically employ sets of tracks for moving the machine, while larger draglines use a "walking" mechanism. These larger machines are referred to as walking draglines. The hoist cable 104 can be retracted or extended by means of a hoist drum (not shown) that is located in the powerplant. Likewise, the drag cable 114 can be retracted and extended by means of a drag drum (not shown) located in the powerplant.

As shown in FIG. 2, the drag cable 114 is connected to pair of drag sockets 116. The drag sockets 116 are connected through drag devises 118 to the drag chains 110. The drag chains 110 are connected to the bucket 106 at hitch devises 120. The drag sockets 116 are also respectively connected to a pair of dump sockets 122 at dump devises 124. A second pair of dump sockets 126 is connected to the front of the bucket 106 at anchor links 128. The dump sockets 122 and 126 are commonly connected to a respective pair of dump cables 112 which ride on dump sheaves 130. A pair of upper hoist cables 132 are commonly connected to the bottom pickup link 134 at their top ends, and opposing sides of a spreader 136 at their bottom ends. A pair of lower hoist cables 138 are connected to the spreader 136 at their top ends, and are connected at their bottom ends to the bucket 106 at trunnions 139. The pickup link 134 is connected to a hoist equalizer 140, which in turn is connected to hoist sockets 142. The hoist sockets 142 are connected to the hoist cables 104. The hoist equalizer 140 is also connected to a pickup link 144, which is connected to a dump sheave shackle assembly 146 that holds the dump sheaves 130.

The loads on the hoist and drag chain links are massive. It is common for the largest draglines to employ hoist and drag cables that are 5 inches in diameter. These cables are made out of very high strength steels, and support suspended loads of upwards of 750,000 lbs. The loads placed on the hoist chains and drag chains are equally impressive. These loads dictate the use of specialized chain links made from ultra-high-strength alloyed steels. In addition, these chains and chain links must be designed to endure a tremendous amount of wear, as discussed below.

A typical dragline digging cycle is shown in FIGS. 3A–3F. As shown in FIG. 3A, the digging cycle begins by lowering the bucket into the mine pit with both the hoist cable and the drag cable nearly taut until the bucket contacts the pit surface. At this point the hoist cable is slightly slackened and the drag cable is pulled toward the powerplant (FIGS. 3B–3E). This results in the bucket teeth digging in and cutting a slice of material that piles inside the bucket. The depth and angle of the cut may be controlled by varying the hoist cable length as the drag cable is pulled.

The most important chain links in the hoist chains are the links that are in close proximity to the uppermost portion of the bucket sidewalls. It is common for these links to get damaged or worn when the spreader bar does not adequately prevent these links from hitting the sidewall of the bucket. Such a situation is shown by FIGS. 4A and 4B. In FIG. 4A the spreader 136 is shown in the ideal position, being centered above the bucket 106 so as to prevent contact between any of the chain links and the sidewalls 146 of the bucket. FIG. 4B shows the position of the spreader and hoist chains when the boom is swung before the bucket has been lifted clear of the surrounding material, a common occurrence during operation. In this case the chain link 147 adjacent the upper edge of the left-hand side of the side wall 146 contacts the left-hand upper sidewall 146 of the bucket at area 148. The links that so contact the bucket sidewall become so worn that they fail prior to the failure of the remainder of the links of the chain, and must be replaced, which is very costly in terms of material and downtime.

A similar contact between one of the chain links and the bucket sidewall can occur if the bucket does not track straight when it is being dragged, or if the bucket encounters a large boulder on one side, causing the bucket to rotate. As shown in FIGS. 3A–3F the chain link 150 moves back and forth adjacent to wear area 152. The chain link 150 wears against the wear area when the bucket is dragged while askew. To compensate for the wear, wear shoes (shrouds) are sometimes added to the upper sidewalls. However, this generally increases the contact between the chain links and bucket (at the shoes (in comparison to a bucket without shoes)), shortening the life of the chain links even further.

FIGS. 5A and 5B show a conventional scheme for compensating for the contact between the lower hoist chain links and the bucket sidewall. This scheme employs the use of two large barrel-shaped links 154, each of which provides a large surface area to wear against the bucket sidewalls. While these links provide an improved life over conventional links, they have the drawback of being significantly heavier than the links they replace. They also increase the bucket sidewall wear due to their larger diameter and barrel shape which results in instances of contact that would not occur with a conventional link.

In addition to the foregoing sidewall wear problems, conventional hoist chains are heavier than desired. This extra weight reduces the payload (the amount of material removed with each bucket load) the dragline can carry, and also increases the stress loading placed on the boom. The payload for a given machine is generally limited by the size of its bucket and the type of material the dragline is working in. The size of the bucket is limited by the maximum allowable suspended load rating of the machine, the suspended load including the weight of a loaded bucket and the weight of the various other components that are supported by the hoist cable (the hoist chains, drag chains, sockets, clevises, etc.—hereinafter the bucket support components). The suspended load rating is primarily a function of the strength of the boom, the torque capacity of the hoist drum and drag drum, and the overall horsepower of the machine.

The maximum suspended load rating for a machine is determined by performing an engineering analysis of the boom structure, using a safety factor that in part is determined by prior experience. It is generally desired to maximize the payload for a given machine, and this usually leads to using the machine at near its maximum suspended load rating. However, operating at near the maximum rating usually can only be performed on newer machines, because the strength of boom is reduced over the lifetime of the dragline. This is due to the constant fatigue loading that is applied to the boom during machine operation. The fatigue loading of the boom can be reduced by reducing the suspended load. Unfortunately, a reduction in the suspended load usually means a reduction in payload.

It would therefore be advantageous to be able to (1) maximize the payload without reducing the suspended load and/or (2) reduce the suspended load without reducing the payload capacity. The first object can be accomplished by increasing the size of the bucket in conjunction with a decrease the weight of the bucket support components. The second object can be accomplished by simply reducing the weight of the bucket support components while maintaining the bucket size.

Both of these objects can be achieved by reducing the weight of the hoist chains. Conventional hoist chain links are sized so that they will be able to support their loads after significant wear. The most common failure point of a hoist chain link is at its ends, which continuously wear on the ends of connecting links as the hoist chains are flexed during dragline operations. Thus, the dragline chain links are sized so that they will support their required load after significant wear of the end portions of the link. The nominal size of the chain links (generally a cross-section thickness) is primarily a function of the strength of the chain link material, the load that must be carried, and empirical wear data. As a result of the wear considerations, conventional hoist chain links are sized to be much larger (and heavier) than would be necessary to carry their nominal loads.

Although a reduction in the weight of the hoist chains is desired, such weight reduction has previously been limited because of the foregoing wear considerations. It is therefore desired to produce reduced-weight hoist chains that have similar performance (wear and strength) characteristics when compared with heavier conventional chains. Furthermore, it is also desired to have a chain link that is configured so as to lessen the contact with bucket sidewalls while maintaining or improving upon the life of the chain link (when compared to conventional hoist chain links), without requiring any additional weight.

SUMMARY OF THE INVENTION

The invention is a dog-bone-shaped chain link that can be used in hoist chains and drag chains to both reduce the chain weight and in the case of the hoist chains reduce the wear between the bucket sidewalls and the links located adjacent to the sidewalls. The chain link is especially well-suited for high-load application, such as dragline hoist chains.

The chain link comprises a shank portion connected to a pair of eye portions at each end of the shank, thereby forming a dog-bone shape with eyelets at the ends. The eyelets are formed by a generally Y-shaped root section that is connected to a hat section that is shaped like half of a torus. The illustrated embodiment of the chain link is preferably flat on its top and bottom side and the cross-section of the shank portion of the chain link is substantially rectangular with radiused corners. According to a second embodiment, the cross-section of the shank portion is a radiused broad I-beam profile having overall a substantially square shape that has a pair of slots formed on its opposing sides. The slots are blended outward toward the ends of the shank portion so as to disappear. The shank portion may be of circular or other configuration.

In the illustrated embodiments the cross-section of the outside portion of the eye hat sections is half-square with radiused corners to match the outside half of the shank cross-section at the forks of the Y-shaped roots. The cross-section of the inside portion of the eye hat sections comprises an arcuate profile over a substantial portion of the length of the hat. The arcuate profile extends slightly above and below the nominal thickness of the link to increase the bite area between a pair of links.

The chain link is preferably made of a high-strength cast alloy steel. A chain can be fabricated by casting a first set of links and then integrally casting a second set of links wherein each second-set link is situated between a pair of first-set links and the links are oriented in an alternating fashion. Subsequent to the casting process, the chain links are preferably heat-treated to increase the hardness of their outer surfaces and tensile strength. Additional surface hardening processes may also be employed to increase the life of the chain.

BRIEF DESCRIPTION OF THE DRAWINGS

FIGS. 3A–3F show the configurations of the bucket and bucket support components during a dragline digging cycle;

FIGS. 4A and 4B show end views of the bucket and hoist chains under normal and askewed conditions;

FIGS. 5A and 5B show application of a prior art chain link when the bucket and hoist chains are under normal and askewed conditions;

FIGS. 6A and 6B show the chain link of the invention when the bucket and hoist chains are under normal and askewed conditions;

FIGS. 6C and 6D show hoist chains comprising multiple dog bone chain links when the bucket and hoist chains are under normal and askewed conditions;

FIG. 7 is a plan view of a first exemplary chain link of the invention;

FIG. 8 is a cross-sectional view of the chain link of FIG. 7 taken along line 8—8;

FIG. 9 is a cross-sectional view of the chain link of FIG. 7 taken along line 9—9 of FIG. 7;

FIG. 10 is a cross-sectional view of the chain link of FIG. 7 taken along line 10—10 of FIG. 7;

FIG. 14 shows an optional configuration of the FIG. 7 chain link that includes a shroud;

FIG. 15 is a cross-section view of the shank portion and shroud of FIG. 14 taken along line 14—14 of FIG. 14.

FIG. 16 is a plan view of the shroud of FIG. 14 when assembled; and

FIG. 17 is a plan view of the base plate of the shroud of FIG. 14.

DETAILED DESCRIPTION

Figure 1:
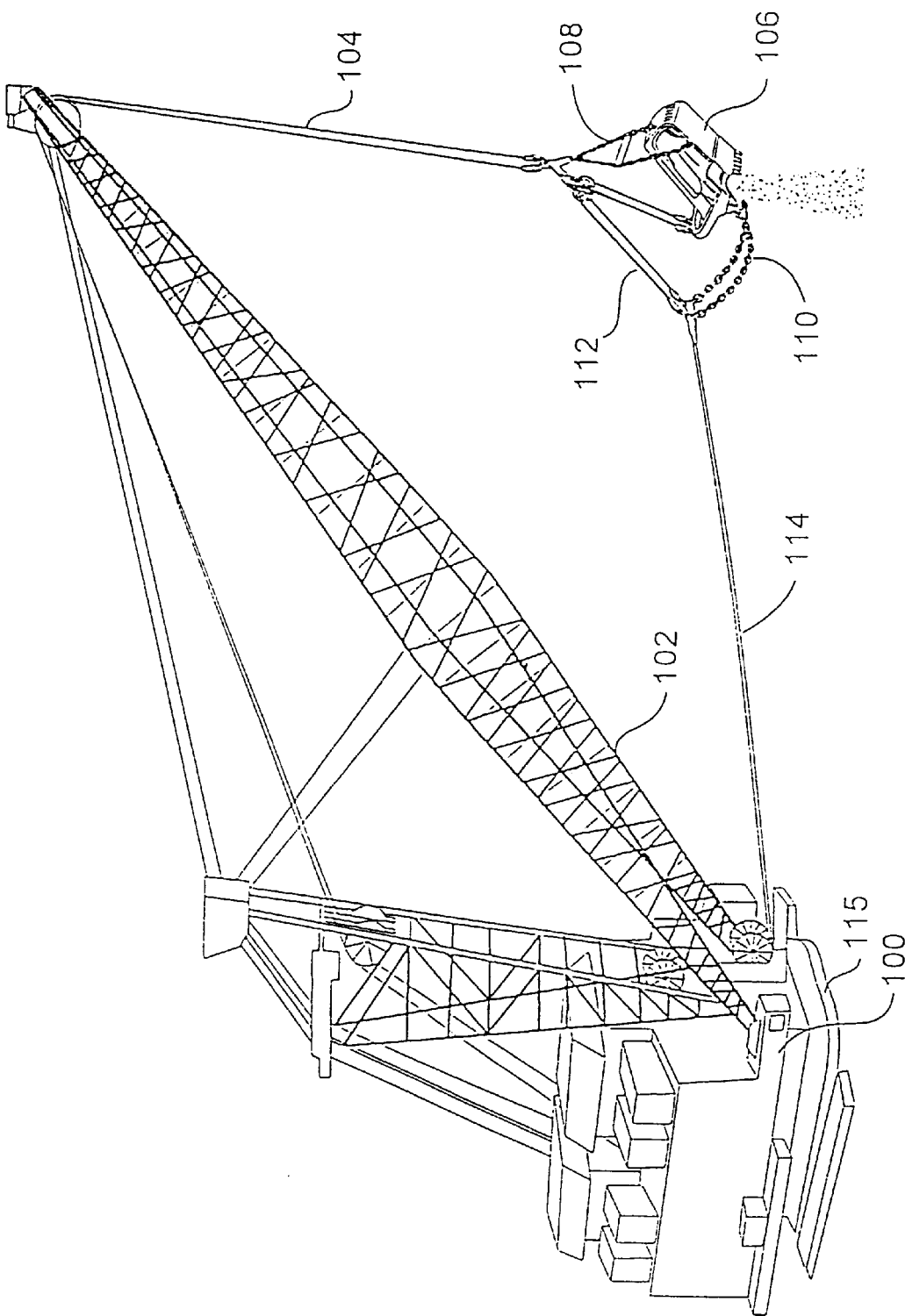
FIG. 1 shows a typical large dragline and its major components.
Figure 2:
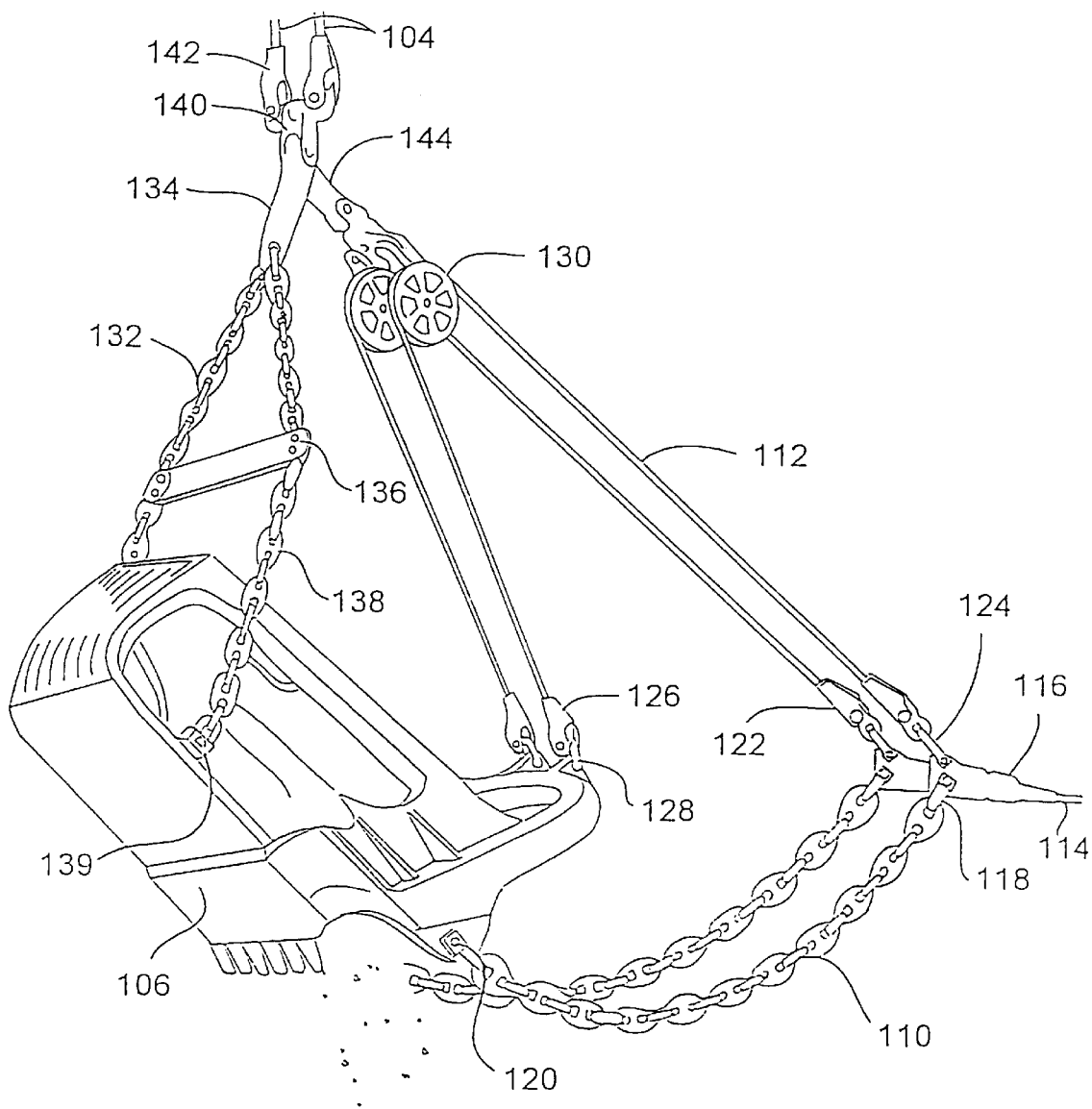
FIG. 2 shows a detailed view of the bucket area of the FIG. 1 dragline.

Referring first to FIGS. 7–10, the chain link 10 therein shown comprises a shank portion 12 connected at opposing ends to a pair of eye portions 14, 16 defining openings 17, 19, respectively. The eye portions 14, 16 are each formed by a Y-shaped root section 18 that is connected to a half-torus-shaped hat section 20 at the ends 22, 24 of forks 26, 28, at which ends the section 10—10 is taken. As shown in FIG. 8, the top surface 13 and bottom surface of the chain link 10 preferably are substantially flat and parallel, except for the areas near the hat sections 20.

A Y-shaped root section 18 comprises a base portion 30 that preferably expands outward from the axial center line 36 along curvilinear paths 32, 34 to the forks 26, 28. The forks 26, 28 are substantially straight and parallel at their respective ends 22, 24. The throat of a root section 18 comprises substantially parallel side walls 38, 40 partially defining the eye at the respective end that are commonly connected to an end wall 42 by rounded corners 44. The side walls 38, 40 are preferably parallel to the axial centerline 36, while the end wall 42 is preferably perpendicular to the side walls 38, 40.

A hat section 20 generally is shaped like a half torus. It comprises an inside arcuate surface 46, and an outside arcuate surface 48, having substantially the same center-point. The hat sections 20 each have a pair of short, parallel extensions 48, 50 that connect with the fork ends 22, 24.

The cross-section 52 of the shank portion 12 is preferably substantially square with rounded corners 54, as shown in FIG. 9. In a typical link, the cross-section 52 comprises a thickness T and width W of 3.5 inches, and radius corners 54 having a ⅝ inch radius.

As shown in FIG. 10, the extensions 48, 50 are also approximately square in shape with rounded corners 58 and have a cross-sectional area substantially equal to that of the shank portion 12. As shown in FIG. 8, the outer portion 60 is of a substantially rectangular profile that matches the outer half of the hat sections 48, 50. The inner and outer portions of 62, 60 are blended together by means of curved surfaces 64 and 66. As best seen in FIG. 8, the inner portion of the section is reduced in dimension as it approaches the extension 48, 50 to blend them together.

The inner portion 62 of a hat section 20 is arcuate in profile and of a radius so as to extend beyond the top and bottom walls of the portion 60 (as the link is portrayed in FIG. 8) as indicated at 68. For example, in a typical link the height H of cross-section area 60 is 4.0 inches, while the radius of arcuate profile 62 is 2.5 inches, and the nominal thickness T is 3.5 inches. The purpose of this arcuate profile is to increase the bite (contact) area between two connected links, thereby increasing the useable life of the links.

Figure 11:
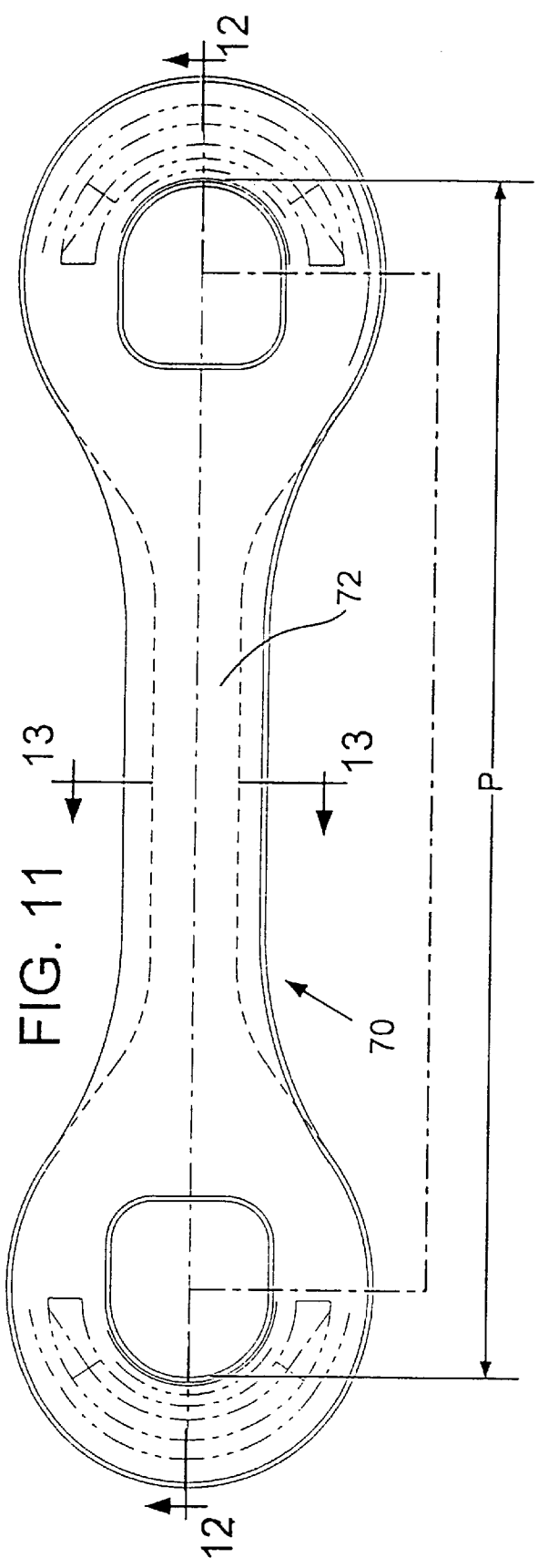
FIG. 11 is a plan view of a second exemplary chain link of the invention.
Figure 12:
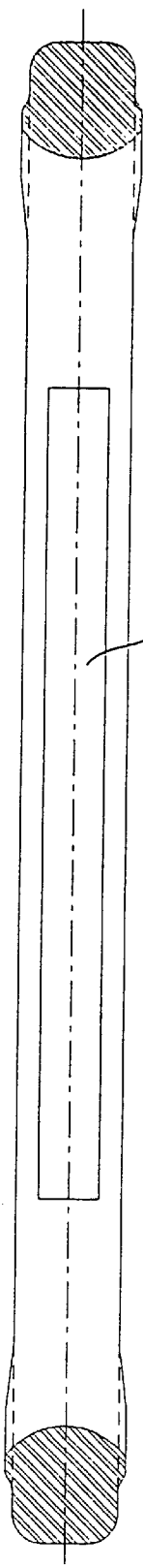
FIG. 12 is a partial cross-sectional view of the chain link of FIG. 11 taken along line 12—12 of FIG. 11.
Figure 13:
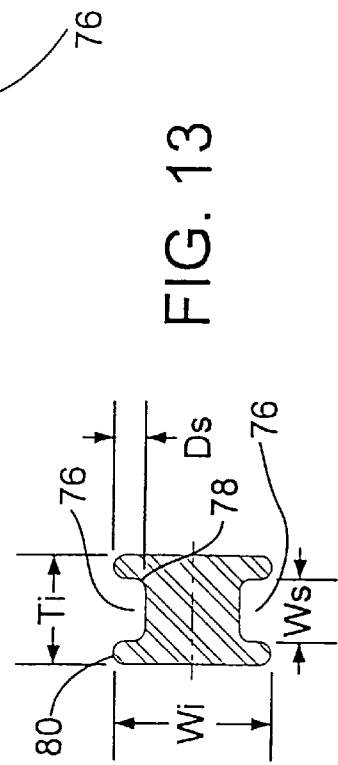
FIG. 13 is a cross-sectional view of the shank portion of the chain link of FIG. 11 taken along line 13—13 of FIG. 11.

The second exemplary chain link 70 of the invention shown in FIGS. 11–13 is substantially similar to the chain link 10, except for the shank portion 72 which comprises a broad I-beam shaped cross-section as shown in FIG. 13. The shank portion 72 has a width Wi that typically is larger than the nominal thickness Ti of the shank 70. A pair of slots 76 are formed in the opposing sides of the shank at a depth of Ds and a width of Ws. For example, a typical chain link 70 may have a width Wi of 5 inches, a nominal thickness Ti of 3.5 inches, a slot depth Ds of 1 inch, and a slot width Ws of 2 inches. The slots 76 additionally contain inside rounded corners 78 and outside corners 80, which may have a radius of about ⅜ inch for a link of the dimensions set forth above.

The slots 76 are adapted to define wells for receiving a hard, wear-resistant material, such as Columbia Steel's XTEND® material, or similar commercially available hard surfacing material, positioned in the slots 76 by laying down molten beads of the material to fill the slots and preferably extend slightly beyond the corners 80.

The pitch P of the chain links 10 and 70 is preferably at least 8 times greater than the nominal width W (and thickness T) of the shank portions of the links. For example, the pitch P of chain link 10 is 42 inches, while the width W is 3.5 inches, leaving a pitch-to-shank-width ratio of 42:3.5= 12.

The chain links are preferably formed from a high-strength cast alloy steel (such as H-39 or H-55). Such chain links typically have tensile strengths in excess of 175,000 psi. For example, a chain link of a nominal thickness of 2.5 inches made from H-39 alloy steel may have a tensile strength of 210,000 psi. Subsequent to the casting process, the chain links are heat-treated to increase the surface hardness in high wear areas, such as the bite area and the outer surface areas of the link. The chain may also be made using a bi-metallic composition process such as Columbia Steel's "XTEND PROCESS" ® on surfaces that are subject to high wear. A chain comprising one or more dogbone chain links can be fabricated by casting a first set of links and then integrally casting a second set of links, wherein each second-set link is situated between a pair of first-set links and the links are oriented in an alternating fashion.

Dragline hoist chains can be formed by linking one or more dog bone chain links to conventional chain links. Conventional hoist chains are formed of links that are substantially similar to the links used in ship anchor chains which require links of short pitch so that the chain is flexible enough to be coiled around windlasses and on reels. Conversely, the majority of the length of a hoist chain does not require such flexibility. Therefore, a hoist chain that comprises the dog bone chain links will not suffer a performance penalty due to its increased chain-link pitch and decreased flexibility. However, it may be necessary to use one or more conventional-pitch chain links at the end of the hoist chains, depending on the particular characteristics of a given dragline configuration. Chains employing chain links made in accordance with the invention will enjoy a reduction in weight of twenty five percent or more as compared to chains solely employing conventional links.

An example of the hoist chains that employ the dog bone chain links of the invention is shown in FIGS. 6A–6D. FIGS. 6A and 6B and FIGS. 6C and 6D show the same end views of a bucket and hoist chains of a dragline that are shown in FIGS. 4A and 4B and FIGS. 5A and 5B. The lower hoist chains 82 include dog bone chain links 84, which are situated adjacent to the normal bucket sidewall wear areas 86. The remaining chain links in the lower hoist chains 82 and the upper hoist chains 88 in FIGS. 6A and 6B comprise conventional links. As an option, additional dog bone chain links 90 can be substituted in place of conventional links, as shown by the upper hoist chain 92 and lower hoist chain 94 of FIGS. 6C and 6D. In this instance each dog bone chain link generally replaces two or more conventional links, depending on the chain link pitch of the relative links. The displacement of the spreader 136 in FIGS. 6B and 6D is identical to the displacement of the spreader 136 in FIGS. 4B and 5B. However, the left-hand dog bone link 84 does not come into contact with the bucket wear area 86 because of the shape of the link. Furthermore, when the link 84 does contact the bucket 106, the contact point will generally be on the outside of the eye portion of the link and not on the shank portion. This enhances the life of the chain link.

A replaceable shroud 202 may optionally be used to prevent wear to the shank portion. As shown in FIGS. 14 and 15, the shroud 202 may be situated about midway along the shank portion 12 of the chain link 10. The shroud 202 comprises a hat section 204 and a base plate 206, which are clamped together and onto the shank portion 12 by a plurality of bolts 207 and nuts 208.

As shown in FIG. 15, the hat section 204 is designed to fit snuggly to three sides of the shank portion 12. The hat section 204 comprises a top plate 210 and a pair of oppositely disposed side bars 212, 214, connected to the top plate 210 by four gussets 216. The top plate 210, side bars 212, 214 and gussets 216 define a rectangular channel in which the chain link shank portion 12 is snugly received as shown in FIG. 15.

The base plate 206 includes a center yoke portion 218 which extends between two side bars 220, 222 which are aligned beneath the hat portion side bars 212, 214, the bolts 207 extending through appropriate openings in the opposed side bars, as shown in FIG. 15 so that the hat portion 204 and base plate 206 may be firmly clamped to the shank 12 by tightening the nuts 208.

The shroud 202 is situated on the shank portion 12 so that when the chain link 10 nears the bucket sidewall the top surface 224 of the shroud engages the bucket, saving the shank portion from receiving wear, and reducing the contact of the outside surfaces of the eye portions 98, 100 with the bucket, thereby prolonging the life of the link 10. The shroud 202 may be replaced when it becomes worn.

Having described the principles of the invention with reference to detailed embodiments, it should be apparent that the invention can be modified in arrangement and detail without departing from such principles. For example, larger and smaller versions of the chain link can be made by changing the cross-sectional width of the leg portions of the chain with a corresponding change in the pitch length so as to maintain a pitch-to-cross-section-width ratio of at least 8:1. The cross-sectional profiles of the shank portions of the chain link can also be modified to suit a particular application, such as increasing the cross section relative to the cross-sections of the forks and hat sections. Many other such variations will be apparent to those skilled in the art.

In view of the many embodiments to which the principles of the invention can be applied, it should be understood that the detailed embodiment is exemplary only and should not be taken as limiting the scope of the invention. We claim as our invention all such embodiments as may fall within the scope and spirit of the following claims, and equivalents thereto.

We claim:

1. In a hoist chain for a dragline, a chain link comprising a shank connected to a pair of eye portions at opposing ends of said shank, said shank having a substantially rectangular cross-section and having a pair of opposing sides and a top and a bottom surface, said top and bottom surfaces being substantially flat and parallel.

2. In a hoist chain for a dragline, the chain link of claim 1 further comprising a replaceable shroud, said shroud being connected to and encapsulating said shank portion so as to prevent wear thereto.

3. In a hoist chain for a dragline, the chain link of claim 1 wherein each of said eye portions comprises a generally Y-shaped root section connected to a substantially half-torus-shaped hat section.

4. In a hoist chain for a dragline, the chain link of claim 3 wherein said root section and said hat section are each of substantially rectangular cross-section at their point of connection.

5. In a hoist chain for a dragline, the chain link of claim 3 wherein each of said eye hat sections is of a predetermined length, said eye hat section having an arcuate inner surface along a substantial portion of said eye hat section length.

6. In a hoist chain for a dragline, the chain link of claim 5, wherein each of said eye hat sections has an inner and an outer portion, said inner portion having an arcuate inner surface along a substantial portion of said eye hat section, said outer portion being substantially rectangular in shape.

7. In a hoist chain for a dragline, the chain link of claim 1 made of alloy steel.

8. In a hoist chain for a dragline, the chain link of claim 6 made of cast alloy steel.

9. In a hoist chain for a dragline, the chain link of claim 7 made of high-strength cast alloy steel with a tensile strength greater than 175,000 psi.

10. A chain link comprising a shank connected to a pair of eye portions at opposing ends of said shank, said shank having a substantially rectangular cross-section and having a pair of opposing sides and a top and a bottom surface, said sides each having a slot formed therein so as to define an I-beam profile, each of said eye portions comprising a generally Y-shaped root section connected to a substantially half-torus-shaped hat section, each of said eye hat sections having an inner and an outer portion and a predetermined length, said inner portion having an arcuate inner surface along a substantial portion of said hat section length, said eye hat section outer portion being substantially rectangular in cross-section, said shank top and bottom surfaces being substantially flat and parallel.

11. A chain link comprising a shank connected to a pair of eye portions at opposing ends of said shank, said shank having a substantially rectangular cross-section and having a pair of opposing sides and a top and a bottom surface, each of said eye portions comprising a generally Y-shaped root section connected to a substantially half-torus-shaped hat section, each of said eye hat sections having an inner and an outer portion and a predetermined length, said inner portion having an arcuate inner surface along a substantial portion of said hat section length, said eye hat section outer portion being substantially rectangular in cross-section, said shank top and bottom surfaces being substantially flat and parallel, and a replaceable shroud connected to and encapsulating said shank portion so as to prevent wear thereto.

12. A dragline hoist chain including one or more chain links comprising a shank connected to a pair of eye portions at opposing ends of said shank, said shank having a substantially rectangular cross-section and having a pair of opposing sides and a top and a bottom surface, each of said eye portions comprising a generally Y-shaped root section connected to a substantially half-torus-shaped hat section, each of said eye hat sections having an inner and an outer portion and a predetermined length, said inner portion having an arcuate inner surface along a substantial portion of said hat section length, said eye hat section outer portion being substantially rectangular in shape, said shank top and bottom surfaces being substantially flat and parallel.

13. The dragline hoist chain of claim 12 made of high-strength alloy steel with a tensile strength greater than 175,000 psi.

14. A combination of a dragline hoist chain and a dragline bucket for use with dragline operations, said dragline hoist chain including a dog-bone chain link comprising a shank connected to a pair of eye portions at opposing ends of said shank, said shank having a substantially rectangular cross-section and having a pair of opposing sides and a top and a bottom surface, each of said eye portions comprising a generally Y-shaped root section connected to a substantially half-torus-shaped hat section, each of said eye hat sections having an inner and an outer portion and a predetermined length, said inner portion having an arcuate inner surface along a substantial portion of said hat section length, said eye hat section outer portion being substantially rectangular in cross-section, said shank top and bottom surfaces being substantially flat and parallel, said dragline bucket having a sidewall wear area, wherein said dog-bone chain link is situated adjacent to said bucket sidewall wear area during a substantial part of the dragline operations.

15. The combination of claim 14, wherein said dog bone chain link comprises a replaceable shroud connected to and encapsulating said link shank so as to prevent wear thereto.

* * * * *

UNITED STATES PATENT AND TRADEMARK OFFICE
CERTIFICATE OF CORRECTION

PATENT NO. : 6,170,248 B1
DATED : January 9, 2001
INVENTOR(S) : Garrick J. Ianello and Bruce C. Johnson It is certified that error appears in the above-identified patent and that said Letters Patent is hereby corrected as shown below:

<u>Title page,</u>
Item [56], References Cited, the following should be added under -- FOREIGN PATENT DOCUMENTS
      15,036    06/1913    Great Britain
      1,200,035   12/1985    Soviet Union --

<u>Column 1,</u>
Lines 45, 46 and 48, each occurrence of "devises" should be -- clevises --.

<u>Column 5,</u>
Line 19, "bottom surface of" should be -- bottom surface 15 of --.

Signed and Sealed this

Twenty-seventh Day of August, 2002

*Attest:*

JAMES E. ROGAN
*Attesting Officer*    *Director of the United States Patent and Trademark Office*